United States Patent [19]

Dokic

[11] Patent Number: 5,726,989
[45] Date of Patent: Mar. 10, 1998

[54] METHOD FOR ENSURING SYNCHRONIZATION OF MPEG-1 DATA CARRIED IN AN MPEG-2 TRANSPORT STREAM

[75] Inventor: Miroslav V. Dokic, Fort Wayne, Ind.

[73] Assignee: Stellar One Corporation, Bellevue, Wash.

[21] Appl. No.: 554,146

[22] Filed: Nov. 6, 1995

[51] Int. Cl.⁶ ............................................. G06F 17/00
[52] U.S. Cl. .................... 370/509; 348/423; 364/514 R
[58] Field of Search ................................ 370/397, 389, 370/412, 466, 469, 474, 476, 509, 510, 512, 517, 519; 348/423, 426, 512, 518; 364/514 R

[56] References Cited

U.S. PATENT DOCUMENTS

| | | |
|---|---|---|
| 5,396,497 | 3/1995 | Veltman . |
| 5,623,423 | 4/1997 | Lipovski ............................ 364/514 R |

OTHER PUBLICATIONS

Coding of Moving Pictures and Associated Audio: Systems (ISO/IEC JTC1/SC 29/WG11 No. 801, Published on Nov. 13, 1994, by the ISO/IEC Copyright Office, Geneva, Switzerland).

*Primary Examiner*—Melvin Marcelo
*Attorney, Agent, or Firm*—Christensen, O'Connor, Johnson & Kindness PLLC

[57] ABSTRACT

A method for ensuring synchronization of MPEG-1 data is carried in an MPEG-2 transport stream for decoding by an MPEG-1 decoder. The method includes searching the MPEG-2 transport stream for a packet start code prefix indicating the start of a PES packet and storing the data associated with the PES packet into a buffer. If the PES packet is a video PES packet, the packet header is examined to determine if a PTS is present. If a PTS is present, the video data in the PES packet are examined during storage to the buffer to locate the first occurrence of a picture start code in the data. Once the first occurrence of a picture start code is located, a flag is set indicating the correspondence between the PTS and the identified picture start code. The video data remaining in the video PES packet is then stored to the buffer without further examination. The PES packet data are stored without examination if a PTS is not present. In either instance, the stored data are transmitted from the buffer to the video decoder in known lengths. If the PES packet is an audio PES packet, a current value of a system time clock is subtracted from a value of a first PTS contained in an audio PES packet to calculate an audio delay. The audio delay is then adjusted to account for audio decoding, audio transmission, and video decoding times. Audio data stored in the buffer are not enabled for delivery to an audio decoder until after the audio delay has elapsed.

14 Claims, 12 Drawing Sheets

METHOD FOR ENSURING SYNCHRONIZATION OF MPEG-1 DATA CARRIED IN AN MPEG-2 TRANSPORT STREAM

FIELD OF THE INVENTION

The invention is directed toward data compression and transfer using standardized protocols and, more specifically, to a method for manipulating data received in an MPEG-2 transport stream so that it may be properly decoded by an MPEG-1 decoder.

BACKGROUND OF THE INVENTION

The transfer of moving pictures and associated audio typically includes compressing the audio/video data comprising the pictures at the source, sending the compressed data to a receiver, and decompressing the data for playback. Much effort has been expended in creating technology that will provide fast and reliable data transfer at a minimal cost. The development has focused on reducing the cost of the hardware and software at the transmitting and receiving ends, and optimizing the throughput of the system. Companies are looking toward the future when the implementation of video-on-demand and similar technology will be commonplace. To this end, the Moving Pictures Expert Group (MPEG) has adopted international standards for the generic coding of moving pictures and audio associated with those pictures.

The first generation of such standards proposed by MPEG is called MPEG-1. More recently, a revised standard, MPEG-2, has been developed, adopted, and placed into use by industry leaders, at least at the transmission end. The MPEG-2 international standard is set forth in a document entitled *Coding of Moving Pictures and Associated Audio* (ISO/IEC JTC1/SC29/WG11 N0801, published on Nov. 13, 1994, by the ISO/IEC Copyright Office, Geneva, Switzerland) which is hereby incorporated by reference.

An MPEG-2 transport stream may contain audio, video, and private data from several programs with different time bases, all of which are multiplexer together. The MPEG-2 standard specifies the syntax of the bit stream, from which the necessary specifications may be derived for encoding and multiplexing of the MPEG-2 transport stream at the encoder side and demultiplexing and decoding at the decoder side. MPEG-2 video and audio decoders have to date been perceived as too expensive to assemble and disseminate on a widespread basis, such as in homes. Instead, developers have focused on the use of less expensive, and commonly available, MPEG-1 video and audio decoders to process MPEG-1 audio and video data carried in an MPEG-2 transport stream.

While compatibilities between the MPEG-1 and MPEG-2 standards exist, the demultiplexing and decoding of MPEG-1 data carried in an MPEG-2 transport stream has proven to be problematic for the industry. Both standards require audio and video data to be truncated into blocks of data of varying lengths for transmission. In the MPEG-1 standard, these blocks of data are referred to as packets, while in the MPEG-2 standard, the blocks of data are referred to as packetized elementary stream (PES) packets.

There are two difficulties associated with processing MPEG-1 data that is carried in an MPEG-2 transport stream. First, according to the MPEG-1 standard an MPEG-1 system stream must have a packet length associated with each packet that is sent. Commonly available MPEG-1 video decoders therefore require the length of each packet within the transport stream to be provided for proper video presentation. In contrast, there is no obligation in the MPEG-2 standard to provide PES packet length information for video PES packets in an MPEG-2 transport stream. Such information is optional, but not often implemented by content providers. Content providers prefer to omit packet length information because it requires a count to be made of the data in each PES packet after the data has been encoded, but prior to sending the PES packet. Counting the data increases system overhead, since all of the data in a PES packet must be processed prior to transmission. Sending a PES packet without the packet length is more efficient because the data in a packet can be separated into blocks that can be immediately sent and subsequently concatenated at the receiver. MPEG-1 data received in MPEG-2 PES packets therefore cannot be directly provided to an MPEG-1 video decoder because the length of the received PES packet is not always provided in the transport stream.

A second hurdle to deciphering an MPEG-2 transport stream carrying MPEG-1 data is that commonly available MPEG-1 video decoders are designed to accept data in even-byte blocks only. However, there is no requirement that video data transmitted in an MPEG-2 transport stream will be in even-byte blocks. The video PES packets sent using the MPEG-2 standard may be of varying lengths; odd-byte packets are routinely transmitted. MPEG-1 data received in MPEG-2 PES packets therefore cannot be directly provided to an MPEG-1 video decoder because the data is not always received in even-byte blocks.

Each of the above problems can affect the synchronization of audio data with their video data counterpart. If the synchronization of the two data streams is compromised, one medium might be delayed relative to another. To provide for the correct synchronization, the MPEG-2 standard calls for the use of a system time clock (STC). The standard recommends comparing program time stamps (PTSs) received with the audio and video data to the STC to ensure proper synchronization. The received PTS values indicate the relative STC time that the data corresponding to the PTS value should be presented to a viewer or listener.

Prior art solutions that enable MPEG-1 video decoders to accept MPEG-1 data received in an MPEG-2 transport stream have apparently had difficulties in providing synchronization relative to the system time clock. For example, some solutions have attempted to provide video and audio synchronization by synchronizing video with respect to audio, as audio is typically the master in the system. Such solutions have typically resulted in underflow or overflow conditions at the MPEG-1 audio and video decoders. Overflow is a condition where a data buffer, whether it be audio or video, is filled beyond its capacity, e.g., data are flowing into the buffer at a rate above that flowing out for a requisite length of time. When this happens, a video frame may be skipped or a portion of the audio may be lost. Underflow occurs when a buffer becomes empty, resulting in a still frame or no audio.

An improved demultiplexer that would allow audio and video signals in an MPEG-2 transport stream to be synchronized with respect to the system clock so that they are properly decoded by an MPEG-1 decoder would be extremely advantageous.

SUMMARY OF THE INVENTION

The invention is a method of ensuring proper presentation of MPEG-1 data carried in an MPEG-2 transport stream for decoding by an MPEG-1 decoder, where the transport stream includes a plurality of packetized elementary stream (PES) packets having video or audio data. Each PES packet includes a packet start code prefix identifying it as a PES packet and identifying the PES packet as either a video or an audio packet. Some of the PES packets include a video presentation time stamp (PTS) or an audio PTS that enables playback of data in the PES packet to be synchronized with a system time clock. The video PES packets with a PTS contain one or more picture start codes that indicate the beginning of a new frame of video data.

The method comprises: (a) searching the MPEG-2 transport stream for a packet start code prefix indicating the start of a PES packet; (b) if the PES packet is a video PES packet, examining the video PES packet to determine if a video PTS is present; (c) storing the data associated with the PES packet in a buffer; (d) if the PES packet is a video PES packet that includes a video PTS in its header, (i) examining the video data in the PES packet during storage to locate the first occurrence of a picture start code, and upon locating the first occurrence of a picture start code, setting a flag indicating the correspondence between the video PTS and the identified picture start code and storing the video data remaining in the video PES packet without further examination, and (ii) transferring blocks of the video data from the buffer to the video decoder in known lengths, each block including a flag indicative of whether the identified video PTS corresponds to a picture start code within that block, if a picture start code is present in that block; and (e) if the PES packet is a video PES packet that does not include a video PTS in its header, transferring blocks of the video data from the buffer to the video decoder in known lengths. If the video PES packet does not include a PTS in its header, the step of transferring blocks of the video data from the buffer to the video decoder in known lengths further includes providing a flag in each block indicating that there is not a PTS that corresponds to a picture start code within that block.

In accordance with one aspect of the invention, transport packets within the MPEG-2 transport stream are processed to remove the PES packet information. Data within the transport packets is transferred to the buffer as the transport packets are received. To optimize the transfer, the data is transferred to the buffer in even byte lengths. If the data within a transport packet is of odd byte length, the last byte of the transport packet is stored as an orphan byte. The orphan byte is then concatenated with the data in the next received transport packet from the same PES packet prior to transfer to the buffer. If an orphan byte is created from the last transport packet in a PES packet, the orphan byte is carried forward and concatenated with the first data byte in the first transport packet from the next PES packet.

In accordance with another aspect of the invention, if the PES packet is an audio PES packet, blocks of the audio data are stored in the buffer during an initial audio delay period. After the delay period has expired, the audio data is transferred from the buffer to the audio decoder. In one aspect of the invention, the initial audio delay is computed by (a) searching the transport stream for an audio PTS and ascertaining its value; (b) reading the value of the STC; and (c) calculating the initial audio delay by computing the difference between the value of the audio PTS and the value of the STC. The initial audio delay is then adjusted to account for audio decoding, audio transmission, and video decoding times.

A significant advantage of the invention is that the data in a video PES packet can be sent to an MPEG-1 video decoder without preprocessing the entire packet to determine its length. The invention ensures audio and video synchronization by preventing overflow and underflow problems that often plague prior art systems.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
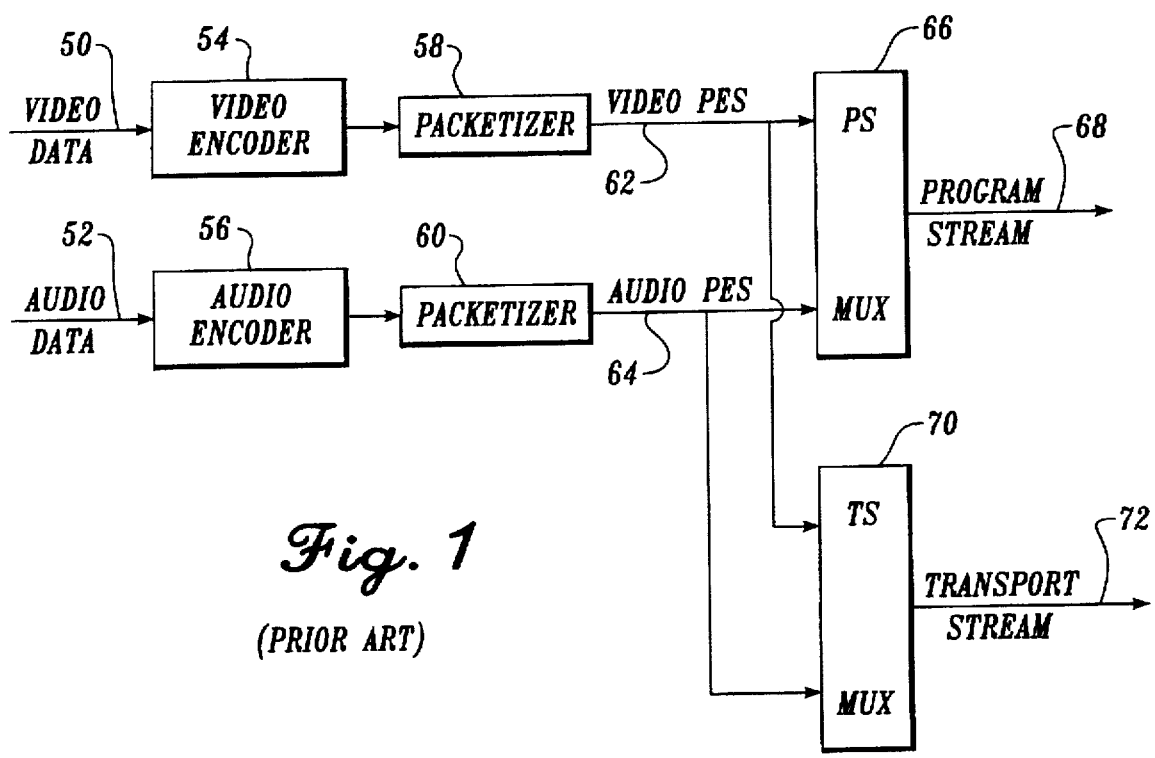
FIG. 1 is a block diagram of an MPEG-2 audio/video encoder as suggested by an MPEG-2 standard.

FIG. 1 is a block diagram of an MPEG-2 audio and video encoder (hereinafter MPEG-2 encoder) as suggested by the MPEG-2 standard. The standard sets forth both semantic and syntactical rules for combining one or more elementary streams of video data 50 and audio data 52 into single or multiple streams that are suitable for transmission. The video data 50 and audio data 52 are encoded prior to transmission using a video encoder 54 and an audio encoder 56, respectively. Encoding the audio and video data reduces the storage space required to store the data, and reduces the bandwidth necessary to transmit the data. After encoding, the resultant data streams are sent to packetizers 58 and 60 which create video and audio "packetized elementary stream" (PES) packets, a data structure defined by the MPEG-2 standard to carry elementary stream data. The PES packet structure is described in greater detail below with respect to FIG. 2 and the accompanying text.

The MPEG-2 standard describes the syntax for encoding and transmitting two streams called a program stream and a transport stream. Each stream is designed for optimal use with a different set of applications. A program stream is the combination of one or more streams of audio and video PES packets that have a common time base. A transport stream is the combination of one or more streams of audio and video PES packets that may have more than a single time base. Further information regarding the program and transport streams may be found in the *Coding of Moving Pictures and Associated Audio* documentation, referenced above. Once the PES packets have been created, the audio and video data are combined using a multiplexer 66 to form a program stream 68. Alternatively, a multiplexer 70 forms a transport stream 72 from the data. For purposes of this application, the disclosed method will be described with respect to an MPEG-2 transport stream. It will be appreciated, however, that the method disclosed herein may be equally applied to an MPEG-2 program stream.

Figure 2:
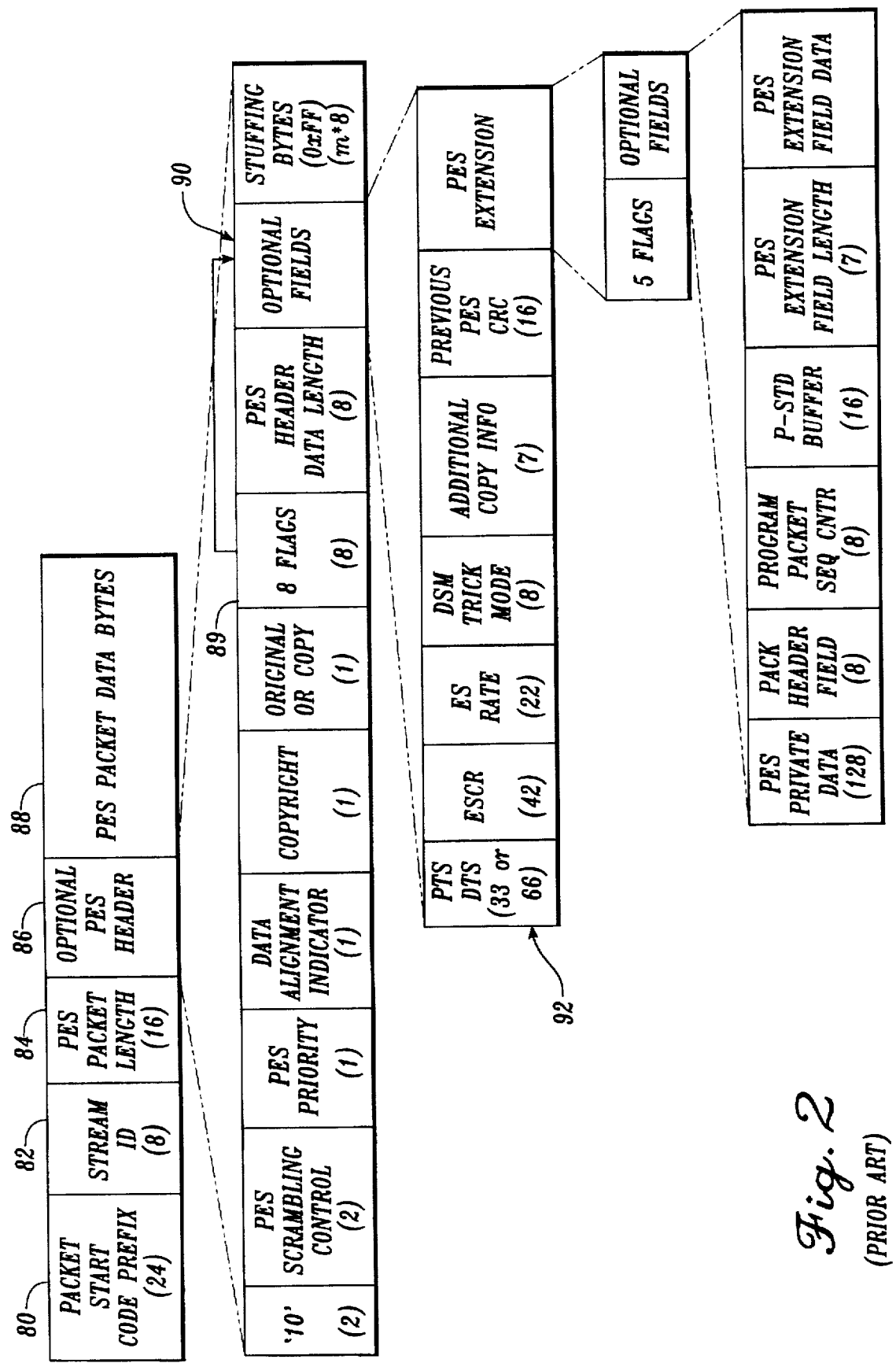
FIG. 2 is a diagram of an MPEG-2 PES packet syntax as suggested by the MPEG-2 standard.

The syntax for an MPEG-2 PES packet is illustrated in FIG. 2. Each PES packet has a packet start code prefix field 80, a stream identification field 82, a packet length field 84, an optional PES header field 86, and a field 88 for the PES packet data bytes. If the PES header is present, the header begins with a 32-bit start code that identifies the contents of the PES packet. The PES header contains eight flags 89 that indicate the presence or absence of data in optional fields 90. Of particular importance to the present application are two flags identified in the MPEG-2 standard as PTS_DTS_ flags. The PTS_DTS_flags indicate the presence of decoding time stamp (DTS) and presentation time stamp (PTS) data 92 in the optional fields. The PTS is a 33-bit value that indicates a time that a "presentation unit," i.e., a decoded audio frame (block) or a decoded video frame (picture), is to be presented to a viewer or listener. To ensure appropriate display of the data, the PTS is provided in the same units and with respect to the time maintained by the system time clock (STC). If properly used, the timing information ensures that the audio and video data is synchronized and that the data buffers in the decoders do not underflow or overflow. While the MPEG-2 standard does not require PTS data to be in each PES packet, PTS data must be included in intermittent PES packets to properly synchronize the presentation of the encoded data at the decoder. Specifically, a video PTS and an audio PTS must each be provided in the MPEG-2 transport stream at least once each 0.7 seconds. The PES header may also include other optional fields, as shown in FIG. 2.

As is discussed in the Background of the Invention, an MPEG-1 video decoder requires a known packet data length in order to accurately process video data, including accurately presenting the data to avoid overflow and underflow conditions. While the packet length field 84 in a PES packet may be used to serve this purpose, many content providers do not include this field when sending data in an MPEG-2 transport stream. As discussed above, providing a length indicator for each PES packet requires a byte count to be made after encoding but prior to transmission. Such a count precludes processing on-the-fly, which has become the preferred mode of operation under MPEG-2. In this context, on-the-fly refers to the encoding and subsequent transmission of blocks of data that are significantly smaller than typical PES packet lengths. In the MPEG-2 transport stream 72 protocol discussed above, the data in each PES packet is separated into transport stream packets of 188 bytes in length for transmission.

Figure 3:
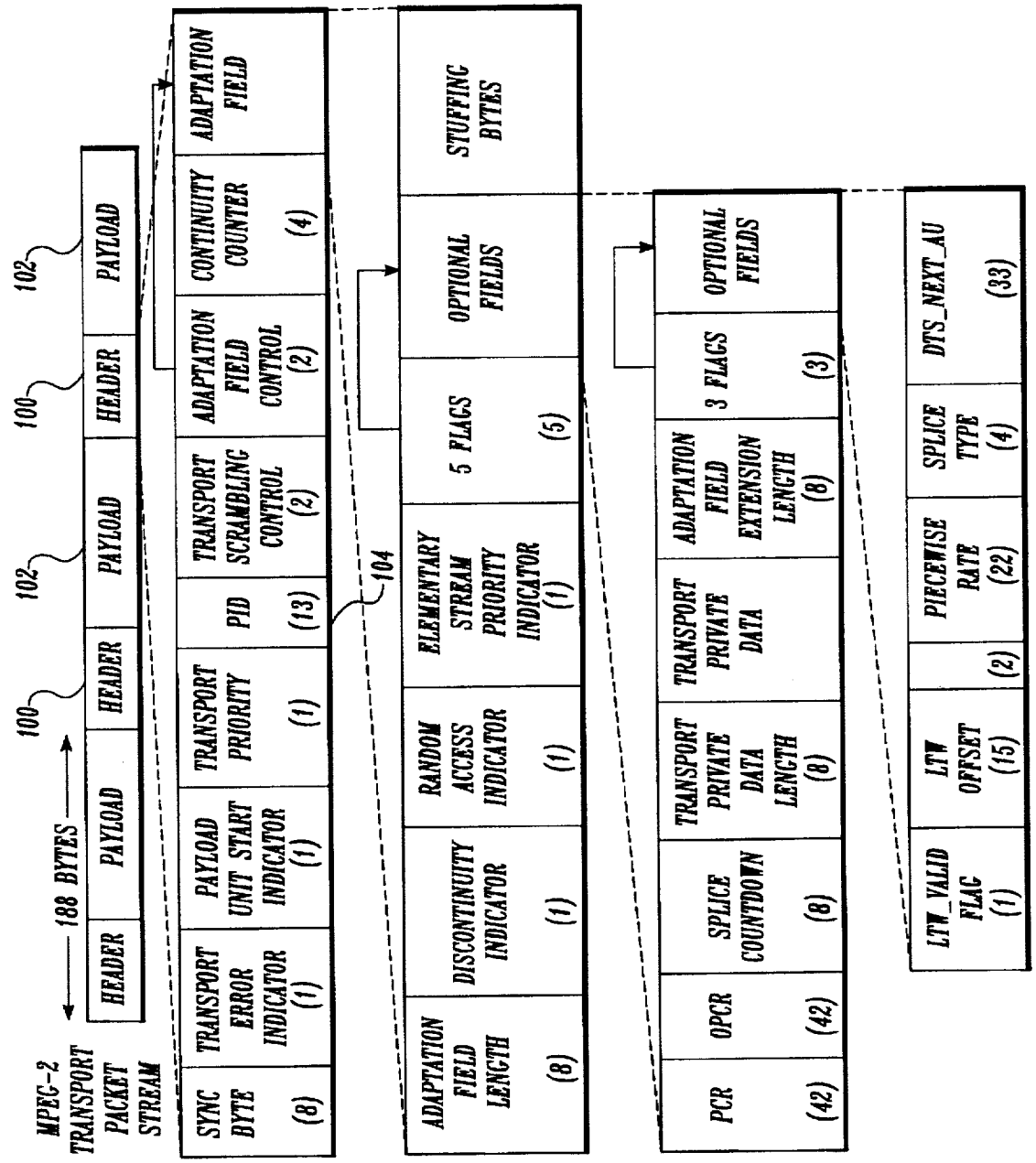
FIG. 3 is a diagram of an MPEG-2 transport packet syntax as suggested by the MPEG-2 standard.

FIG. 3 illustrates the syntax for a transport packet stream. Each 188-byte transport packet includes a header 100 and a payload 102. Each PES packet is divided and inserted into multiple transport stream packets, with the first byte of each PES packet header located at the first available location of a transport stream packet. Each transport packet begins with a 4-byte prefix, part of which includes a packet identifier (PID) 104 specifying the contents contained in the payload. The header 100 also includes other required and optional fields that assist in the synchronization and decoding of audio and video data at playback. The payload refers to the data bytes that follow the header bytes in a transport packet. If, for example, a payload from a packet having a given PID includes a PES packet header, payloads from subsequent transport packets with the same PID will contain the remaining PES packet data bytes. In an MPEG-2 transport stream, the end of a PES packet is only identified by the receipt of the next PES packet header.

Figure 4:
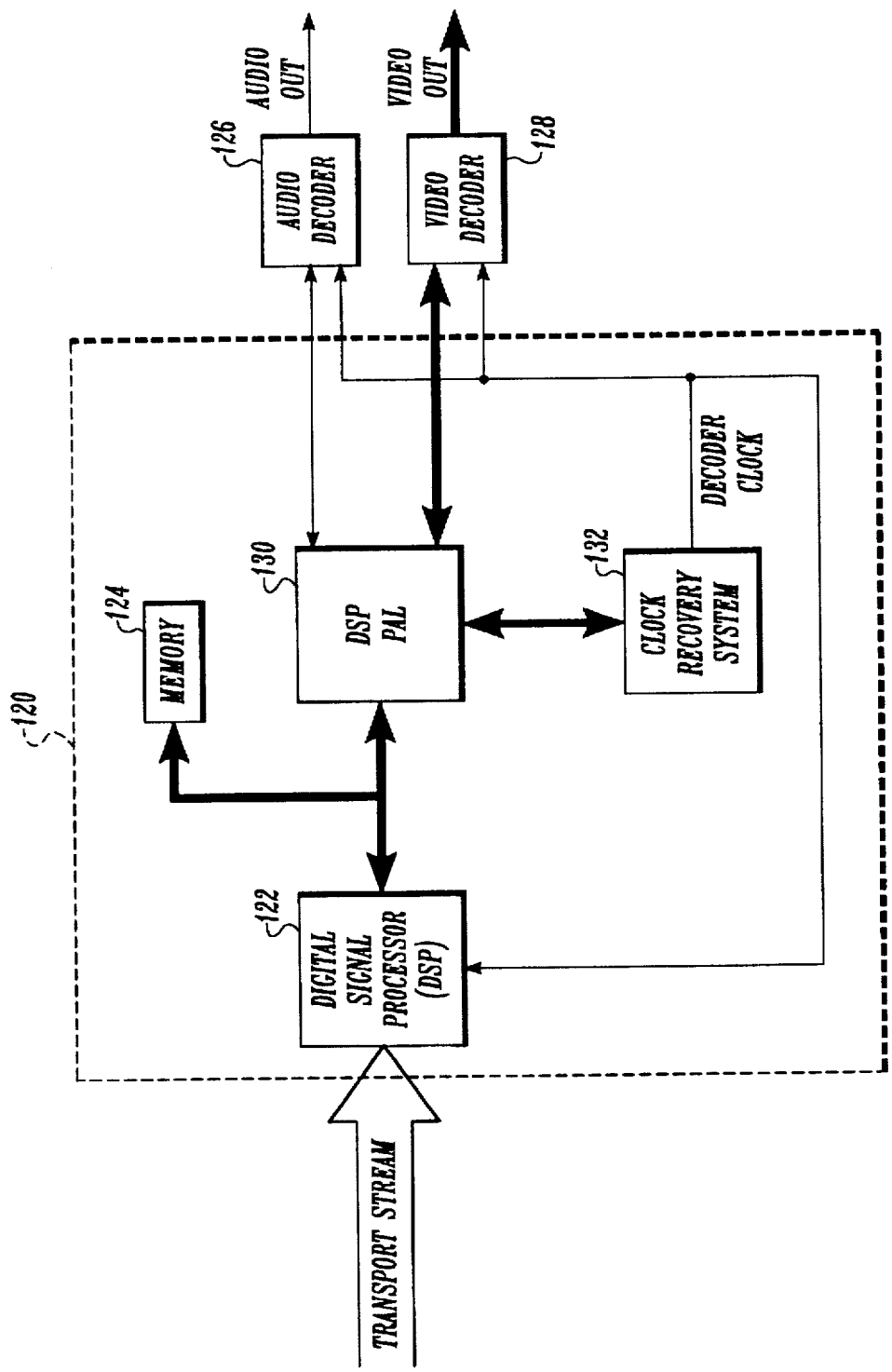
FIG. 4 is a block diagram of an exemplary MPEG-2 decoder for demultiplexing audio and video data from an MPEG-2 transport stream and providing the audio and video data to MPEG-1 audio and video decoders.

FIGURE 4 illustrates an exemplary demultiplexer 120 for demultiplexing audio and video data received in an MPEG-2 transport stream, and providing the audio and video data to MPEG-1 audio and video decoders in accordance with the present invention. The demultiplexer 120 includes a digital signal processor 122 that demultiplexes the MPEG-2 transport stream into its constituent audio and video parts. More specifically, the digital signal processor 122 processes the transport stream as the stream is received, and demultiplexes the data stream based upon the transport packet headers in the stream. By properly identifying the payload content in each received transport packet, the digital signal processor separates the audio, video, and control information. An exemplary routine used by the demultiplexer 120 to demultiplex and ensure synchronization during presentation of the MPEG-1 video and audio data carried in the MPEG-2 transport stream is set forth in FIGS. 5A–5G.

After demultiplexing, the audio and video data are stored in a memory 124 for subsequent transmission to MPEG-1 audio and video decoders 126 and 128, respectively. A programmable array logic (PAL) chip 130 is coupled to the digital signal processor 122, the memory 124, and the audio and video decoders 126 and 128. The PAL chip 130 is used to address the memory and the decoders. A clock recovery system 132 is coupled to the PAL chip 130 and the decoders to recover a system clock from the received transport stream. Further information about a clock recovery system suitable for this task is disclosed in a concurrently filed U.S. application Ser. No. 08/554,147 entitled "*Method and System for the Recovery of an Encoder Clock from an MPEG-2 Transport Stream,*" which is commonly assigned to the assignee of the present application, and expressly incorporated herein by reference (hereinafter *Clock Recovery System* application). Further information about the hardware architecture disclosed in FIG. 4 and described briefly herein is provided in a concurrently filed U.S. application Ser. No. 08/554,155 entitled "*MPEG-2 Transport Stream Decoder Having Decoupled Hardware Architecture,*" commonly assigned to the assignee of the present application, and expressly incorporated herein by reference (hereinafter *Decoupled Architecture* application).

FIGS. 5A–5G illustrate an exemplary routine for processing an MPEG-2 transport stream to demultiplex and store audio and video data that is contained within the transport stream. The routine also ensures synchronization of the audio and video data by managing the transfer of the data to the MPEG-1 audio and video decoders. At block 200, variables required in the routine are initialized to a default setting. At a block 202, an MPEG-2 transport packet is received by the MPEG-2 decoder. As described in further detail in the copending *Decoupled Architecture* application, the hardware of the decoder allows two transport packets to be received by the digital signal processor. As one transport packet is being loaded, the second is being processed according to the routine below. Further detail of the hardware required to perform this processing is disclosed in the copending application.

At a block 204, the packet identifier (PID) information is parsed from the transport packet header. The packet identifier is compared with a program map table contained within the MPEG-2 decoder to determine what type of packet has been received. At a decision block 206, it is determined whether the packet contains video data. If the packet contains video data, the routine continues with a video recovery loop for loading the video data, beginning with a decision block 220. If the packet does not contain video data, at a decision block 208 the packet identifier is examined to determine if the packet contains audio data. If the packet contains audio data, an audio recovery loop is started beginning with a decision block 380. If the packet does not contain audio data, the routine returns to decision block 202 where it waits to receive the next transport packet. It will be appreciated that within an MPEG-2 transport stream video, audio, and private data packages are interspersed. While the routine shown in FIGS. 5A–5G is capable of demultiplexing audio and video data, it will be appreciated that the routine could also be expanded to handle the demultiplexing of other types of packets.

If the packet contains video information, at decision block 220 a test is made to determine whether PES header information is present in the received transport packet. If header information is present, it indicates the beginning of a new PES packet and the end of the previous PES packet. It is noted that at startup of the demultiplexer, e.g., the beginning of a broadcast, any data that is received prior to the first full PES packet will be lost. However, this is customary and accounted for by content providers.

At a decision block 222, a test is made to determine if leftover data from the previous PES packet is contained in a video buffer. The method disclosed herein allows the data received in MPEG-2 PES packets to be decoded by an MPEG-1 video decoder by dividing the PES packets into blocks of known size. In accordance with the present invention, video data from each transport packet is therefore initially stored in a video buffer (memory 124). Blocks of video data from each PES packet are then enabled for delivery to an MPEG-1 video decoder 128 in known lengths. In one embodiment, the data comprising a video PES packet is enabled for delivery in two kilobyte (2K) blocks. Since PES packets are not necessarily an even multiple of 2K in length, the last block of data will typically be under 2K in length. When a PES header is received, a portion of the previous PES packet will be remaining in the video buffer. The first task upon receiving a new PES packet is therefore enabling the block of data remaining from the last PES packet for delivery to the MPEG-1 video decoder.

If video data remains in the video buffer, at a block 224 a test is made to determine whether an orphan byte remains from the last transport packet. In the preferred embodiment of the MPEG-2 decoder, data is transferred from the digital signal processor 122 to the memory 124 in 2 byte (or 16 bit) increments. Data is also transferred between the memory 124 and the video decoder 128 in 2 byte increments. The size of the data transfer is dictated by the 16 bit architecture of the MPEG-1 video decoder. As discussed above, MPEG-2 transport packets may contain less than an even number of bytes. Since the demultiplexer requires data transfer in 2 byte increments, when transferring data from the demultiplexer to the video buffer an extra byte may remain at the end of the transport packet. For purposes of this application, the remaining byte will be referred to as an "orphan" byte. The present routine handles orphan bytes by storing the byte and concatenating the byte with the first byte of the next received transport packet from the PES block being processed. Decision block 224 therefore checks to see if an orphan byte remains from the last processed transport packet from the video PES packet. If an orphan byte remains, at a block 226 an orphan flag is set.

After determining whether an orphan byte exists, at a decision block 228 a test is made to determine whether a picture start code has been found. As will be appreciated from the discussion below, if a video PES packet contains a PTS the data within the PES packet is searched to find the occurrence of a picture start code that corresponds to that PTS. Upon locating the picture start code, a flag is set that indicates the block of data being searched contains the picture start code corresponding to the PTS. If the picture start code corresponding to the PTS is contained in the data remaining from the previous PES packet in the video buffer, at a block 230 a flag is set indicating that the block of data contains the picture start code.

After testing for the picture start code, at a block 232 the data remaining within the video buffer is enabled for delivery to the video decoder. In this context, "enabled" refers to the issuance of a command to the MPEG-1 video decoder indicating that a data block is available for delivery from the video buffer. Enablement also entails the movement of a memory pointer in the video buffer to allocate that block for transfer. As the video data is received in the MPEG-2 transport stream, it is transferred from each transport packet into the video buffer. As the video buffer fills, a pointer is maintained between newly received data and data that is available for transfer to the video decoder. When data is available for transfer to the video decoder, i.e., when a 2K block has been received, a command is first sent to the video decoder having the following syntax:

NewPacket (block length, PTS, PTS valid)

where:

block length=the size of the block that is available for transfer;

PTS=the PTS value (if present) from the PES packet header; and

PTS valid=a flag indicating whether the PTS value is valid for a picture start code contained in the block of data. If no PTS is present for the particular PES packet, the PTS valid flag will be invalid for all blocks from that particular PES packet.

After sending the command to the video decoder, the pointer is moved to allow the video decoder access to the data block contained within the video buffer. After movement of the pointer, a background routine transfers the video data from the video buffer to the video decoder at a rate dictated by the video decoder. The background routine is described below with respect to FIG. 6 and the accompanying text. The routine disclosed in FIGS. 5A–5G therefore separates the video data from the MPEG-2 transport stream and stores the video data within the video buffer, but does not control the transfer of the video data from the video buffer to the video decoder.

After processing any leftover data that remains from the last PES packet in the video buffer, the routine proceeds to a block 234 where two flags are reinitialized. The first flag corresponds to whether a PTS is present within the current PES packet header. The second flag corresponds to whether a picture start code has been located within the PES packet currently being processed. When decoding new PES header information, these flags are both reset to indicate that a PTS and a picture start code have not been identified in the new PES packet. At a decision block 236, a test is made to determine whether a video PTS is present in the PES header that is being processed. If a video PTS is present in the PES header, at a block 238 the PTS is parsed from the PES header and stored. At a block 240 a flag is set indicating that a PTS exists for the current PES packet being processed. A flag is also set indicating that the picture start code contained within that PES packet has not yet been found. After identifying the PTS within the PES packet, a picture start code must be found within the PES packet payload that corresponds with the PTS within the header. It will be appreciated that the MPEG-2 standard requires that the PTS correspond to the first picture start code contained within the PES packet payload. Thus, until the first picture start code is detected, a test must be made of all data within the PES packet payload to find the picture start code. This processing is performed by the video recovery loop on a transport packet-by-transport packet basis.

At a block 250, the payload length of the MPEG-2 transport packet is determined. At a decision block 252, a test is made to see if the orphan flag has been set. The orphan flag will be set if an extra byte was contained in the prior MPEG-2 transport packet. If the orphan flag is set, at a block 254 the first byte of the payload of the present MPEG-2 transport packet is removed and concatenated with the stored orphan byte. At a block 256 the concatenated first byte and orphan byte are stored in the video buffer. The orphan byte must be concatenated with a byte in the current transport packet to ensure that a 16 bit value is transferred in memory. After storing the concatenated byte, at a block 258 the payload length is decremented by one to account for the byte that was used to concatenate with the orphan byte.

After handling any orphan bytes that remain from the prior transport packet, at a decision block 262 a test is made to determine whether an orphan byte will be generated from the present transport packet. That is, at a decision block 262 a test is made to determine whether the length of the remaining transport packet payload is an odd number of bytes. If the transport packet payload length is odd, at a block 264 the last byte of the payload is removed and stored as an orphan byte. At a block 266, the orphan flag is then set to indicate that an orphan byte from the present packet must be concatenated with the first byte of the next transport packet during processing of the next packet. If the length of the payload is not odd, at a block 268 the orphan flag is reset to indicate that no orphan byte exists for concatenating with the next received transport packet.

After handling orphan bytes from the present transport packet, at a block 270 the remaining payload of the transport packet is stored in the video buffer. As the payload data from the transport packet is stored in the video buffer, a search is made of the data to determine if the picture start code is present in the data. As specified in the MPEG-2 standard, the picture start code is 0x00 00 01 00. A search is therefore made of the data as it is transferred to the video buffer for the presence of the picture start code. It will be appreciated that if a first byte from the transport packet has been concatenated with an orphan byte, the search must include the first byte from the transport packet in the event that the picture start code begins immediately following the transport packet header.

At a decision block 272, a test is made to determine if the picture start code was found within the payload data. If the picture start code was present, at a block 274 the picture start code flag is set to indicate the presence of a picture start code within the block of video data that is currently being stored in the video buffer. Additionally, the new video PTS flag is reset to indicate that the PTS from the PES packet being processed does not correspond to any subsequently received picture start codes in the PES packet payload.

After transferring the payload data from the transport packet being processed to the video buffer, at a block 290 an examination is made of the mount of data currently contained within the video buffer. At a decision block 292, a test is made to determine whether the length of the data in the video buffer is greater than 2K. If the length of the data currently contained within the video buffer is not greater than 2K, the routine returns to a block 202 to process the data contained within the next received transport packet. If, however, the data within the video buffer is greater than 2K, at a block 294 a test is made to determine whether the picture start code found flag has been set. If the picture start code is contained within the 2K block of data to be transferred to the video decoder, at a block 296 a flag is set indicating that the 2K block of data contains the picture start code.

At a block 300, the 2K block of data that is contained within the video buffer is enabled for delivery to the video decoder. As discussed above, enablement implies that a command is sent to the video decoder providing the size of the block that is available for transfer to the video decoder, the PTS of the current PES packet (if present), and a flag indicating whether the picture start code contained within that block corresponds with the PTS. A pointer is also moved in the video buffer allowing the video decoder to access the 2K block of the video buffer. After enabling transfer of the data within the video buffer to the video decoder, the routine returns to a block 202 where the next MPEG-2 transport packet is processed.

Returning to decision block 236, if the PES header present in the received transport packet does not indicate that a video PTS is present in the PES header, the program proceeds to a block 310. A portion of the video recovery loop described by blocks 310–330 processes the transport packet similarly to that described above. That is, at a block 310 the payload length of the transport packet is determined. At blocks 312–318, an orphan byte from the last transport packet is handled by concatenating the byte with the first byte of the payload from the current transport packet. At blocks 322–328, an orphan byte from the present transport packet is handled by removing the last byte of the transport packet and saving it as an orphan byte for concatenation with the first byte from the next transport packet. At a block 330, the remaining payload is stored in the video buffer. It will be appreciated that when a PTS is not contained within the PES packet header, it is not necessary to search for a picture start code within the PES payload. Without examining the data contained within each transport packet, the routine therefore immediately transfers the data to the video buffer at block 330. After block 330, the routine continues to blocks 290–298 where the mount of data in the video buffer is examined. If the amount of video data has exceeded 2K, a block of data is enabled for delivery to the video decoder.

Returning to decision block 220, if PES header information is not present in the currently received transport packet, the routine proceeds to a block 340. At a block 340, a test is made to determine whether a PTS exists for the PES packet being processed, and if so, whether the picture start code has been found within the current PES packet being processed. If the picture start code has not been found, the routine continues to blocks 250–274 where the data is searched as the payload data is transferred to the video buffer. The search continues until the first picture start code within the PES packet is identified. If the picture start code has been found or if there is no video PTS present within the current PES packet being processed, the routine continues to a block 342 where it determines the payload length of the current transport packet. The payload is then processed in a manner similar to that described above. At blocks 344–350, the existence of an orphan byte from the last transport packet is handled by concatenating the orphan byte with the first byte of the present transport packet payload. At blocks 354–360, the present transport payload is examined and an orphan byte generated if the payload is of an odd length. At a block 362, the remaining payload is stored within the video buffer.

The routine then continues to blocks 290-298 where the length of the data stored in the video buffer is examined, and a 2K block of the data enabled if present within the video buffer. It will be appreciated that the portion of the routine defined by blocks 342 through 362 will be the typical path for each received transport packet. That is, the majority of the time the video recovery loop is merely taking the transport payload and transferring it directly to the video buffer without examination of the payload. Only when a picture start code must be identified within a given PES packet must the payload be processed. After finding the first picture start code, the examination of data is halted and the video data transferred directly to the video buffer. The demultiplexing routine is therefore very efficient at converting the received PES packets into blocks of data for transfer to an MPEG-1 decoder.

A further advantage of the routine described in FIGS. 5A–5G is that orphan logic is handled at the transport packet level. Since present MPEG-1 video decoders require data in 16-bit quantities, the routine ensures that the video data is appropriately stored in the video buffer by concatenating bytes from consecutive transport packets in a given PES packet. No data is lost by discarding any odd bytes from a transport packet payload. The routine therefore ensures the accurate delivery of data to the video decoder, while performing a minimum mount of processing on the transport packets as they are received.

With reference to block 206, if it was determined that the PES packet did not contain video data, a test is made at block 208 to determine if the packet contains audio data. If the packet contains audio data, the routine continues to an audio recovery loop to decode and synchronize audio portions of the current picture. To achieve accurate audio/video synchronization, the audio data must be synchronized with respect to the system time clock. Since currently available MPEG-1 audio decoders do not handle PES header processing, i.e., they only process the audio payload data, it is the responsibility of the demultiplexer to deliver data to the MPEG-1 audio decoder at the appropriate time. At block 380, a test is made to determine if the received transport packet contains the audio PES header. If the packet contains the PES header, at block 382 a test is made to determine if the header includes a PTS. Whether the header includes a PTS will be determined by the state of the PTS_DTS_flags. If a PTS is contained in the header, the routine continues to a decision block 384 where a test is made to determine if an initial audio delay has been calculated. By way of an overview, once an audio PTS is found in the transport stream, the local STC value is read and the difference between the two is computed. The difference is in 90 kilohertz (kHz) units and denotes the time that the first sample from the audio frame needs to be delayed in the audio path before being presented to a listener. A rough estimate of the audio delay that the audio data must be held before presentation to the listener is therefore:

$$\text{audio delay} = \text{audio } PTS - STC \quad (1)$$

However, in practical applications other sources of delay have to be taken into account. In particular, the audio decoding delay, audio transfer delay, and the video decoding delay must be calculated. The MPEG-1 decoding delay for a preferred decoder is calculated by divided 512 by the sampling frequency for the audio signal, which is typically 32, 44.1, or 48 kHz. Also, the audio decoding cannot start until all data from the entire audio frame is present at the MPEG-1 audio decoder due to the multichannel encoding techniques employed. A finite mount of time is therefore needed to transfer the entire audio frame from the demultiplexer to the MPEG-1 audio decoder. Given these, the calculation of the adjusted audio delay is as follows, in 90 kHz units.

$$\text{Initial audio delay} = (\text{audio } PTS - STC) - \quad (2)$$
$$(\text{audio decoding delay} + \text{audio transfer delay} + \text{video decoding delay})$$

In a preferred embodiment, the audio decoding delay may range between 10–16 ms, the audio transfer delay may range between 1–10 ms, and the video decoding delay may range between 10–33 ms. During the initial audio delay, audio data is being parsed and stored in the audio delivery buffer. After the initial audio delay expires, the audio data is enabled for delivery to the MPEG-1 audio decoder. The decoder may then access the audio data at an appropriate rate for conversion into an analog signal and presentation to a listener.

Figure 5A:
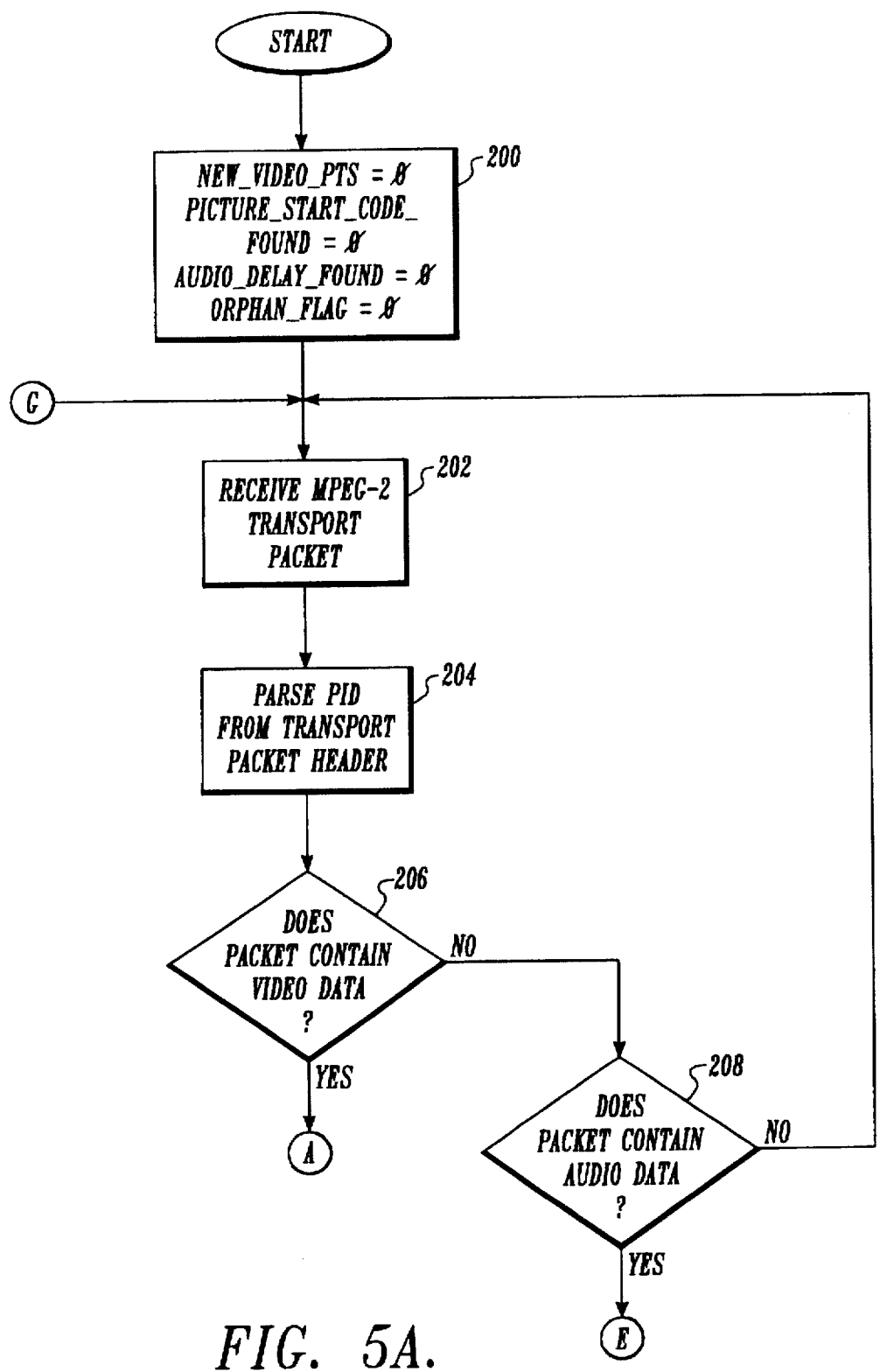
FIGS. 5A-5G are flowcharts of an exemplary routine for examining transport packets received in the MPEG-2 transport stream, demultiplexing the received transport packets into audio and video data, and storing the audio and video data in a buffer for subsequent transfer to MPEG-1 audio and video decoders.
Figure 5B:
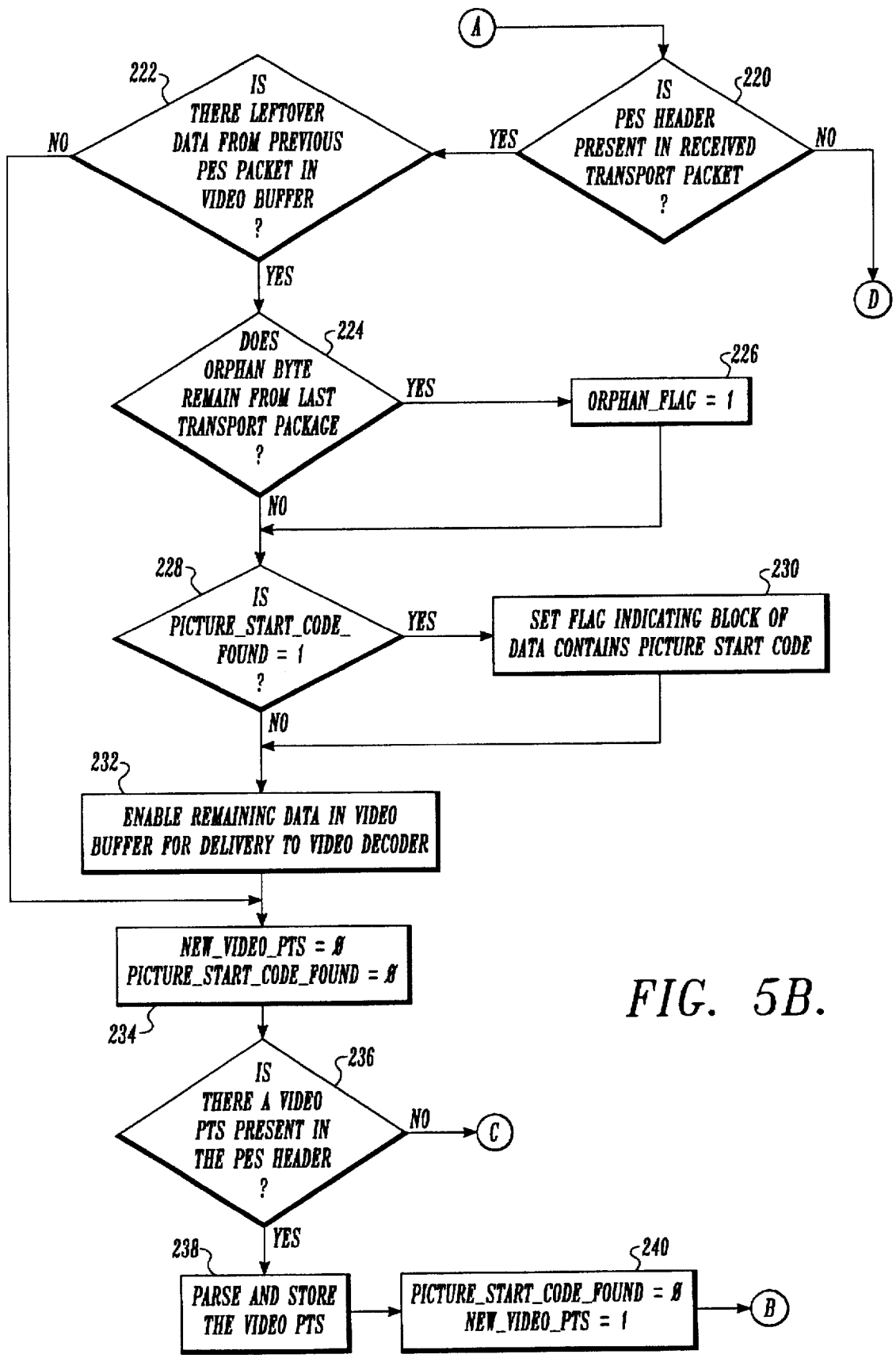
Figure 5C:
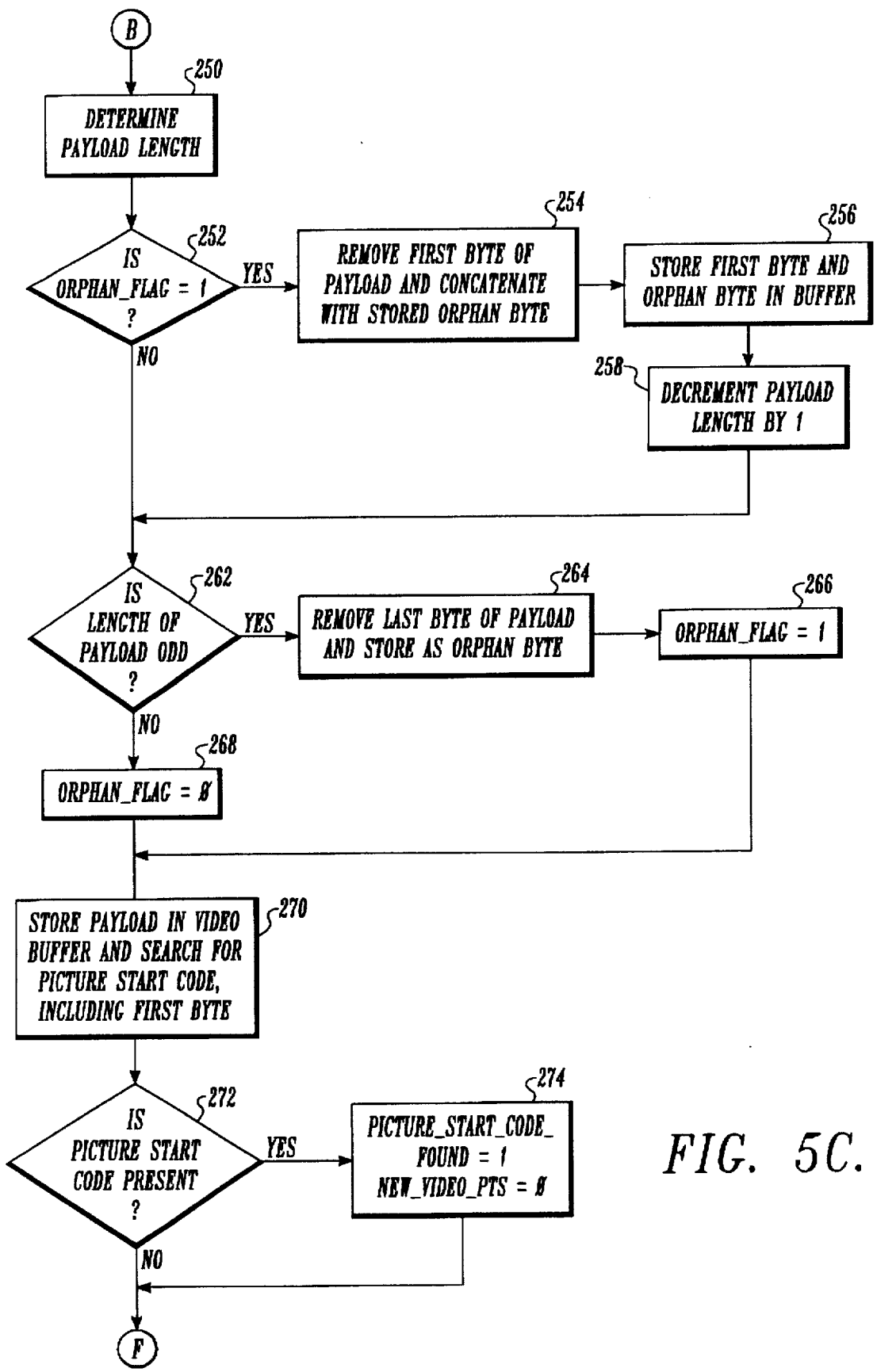
Figure 5D:
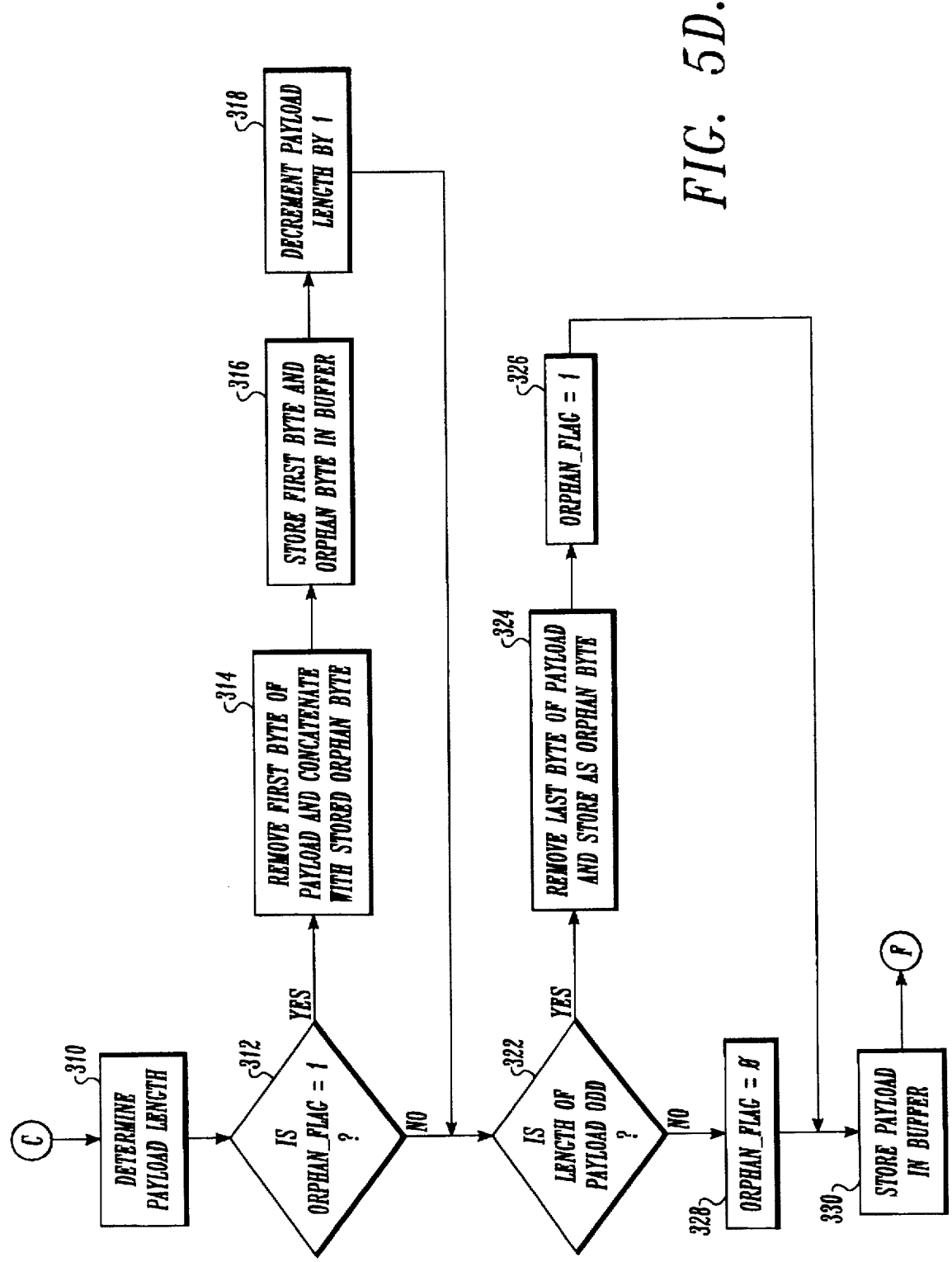
Figure 5E:
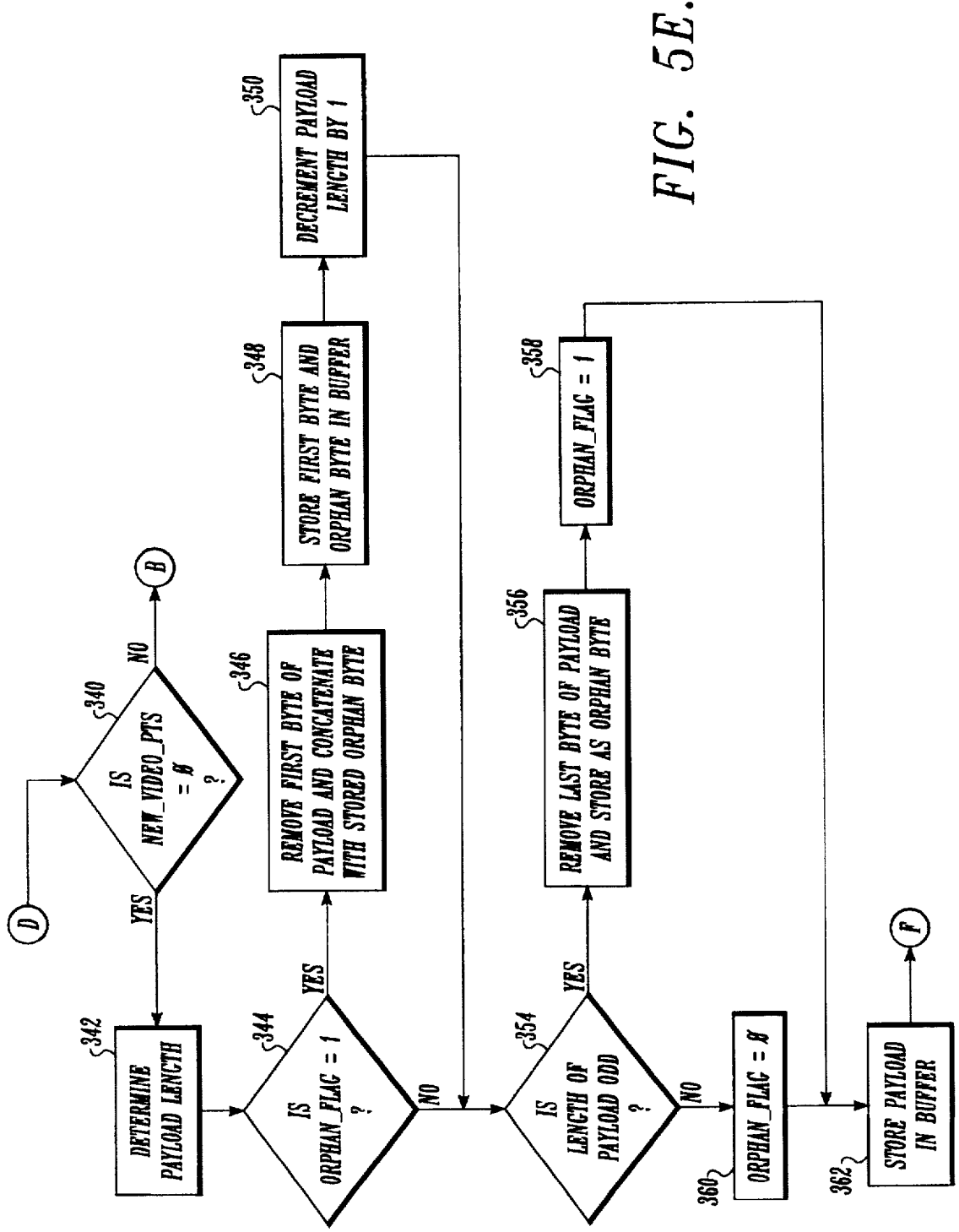
Figure 5F:
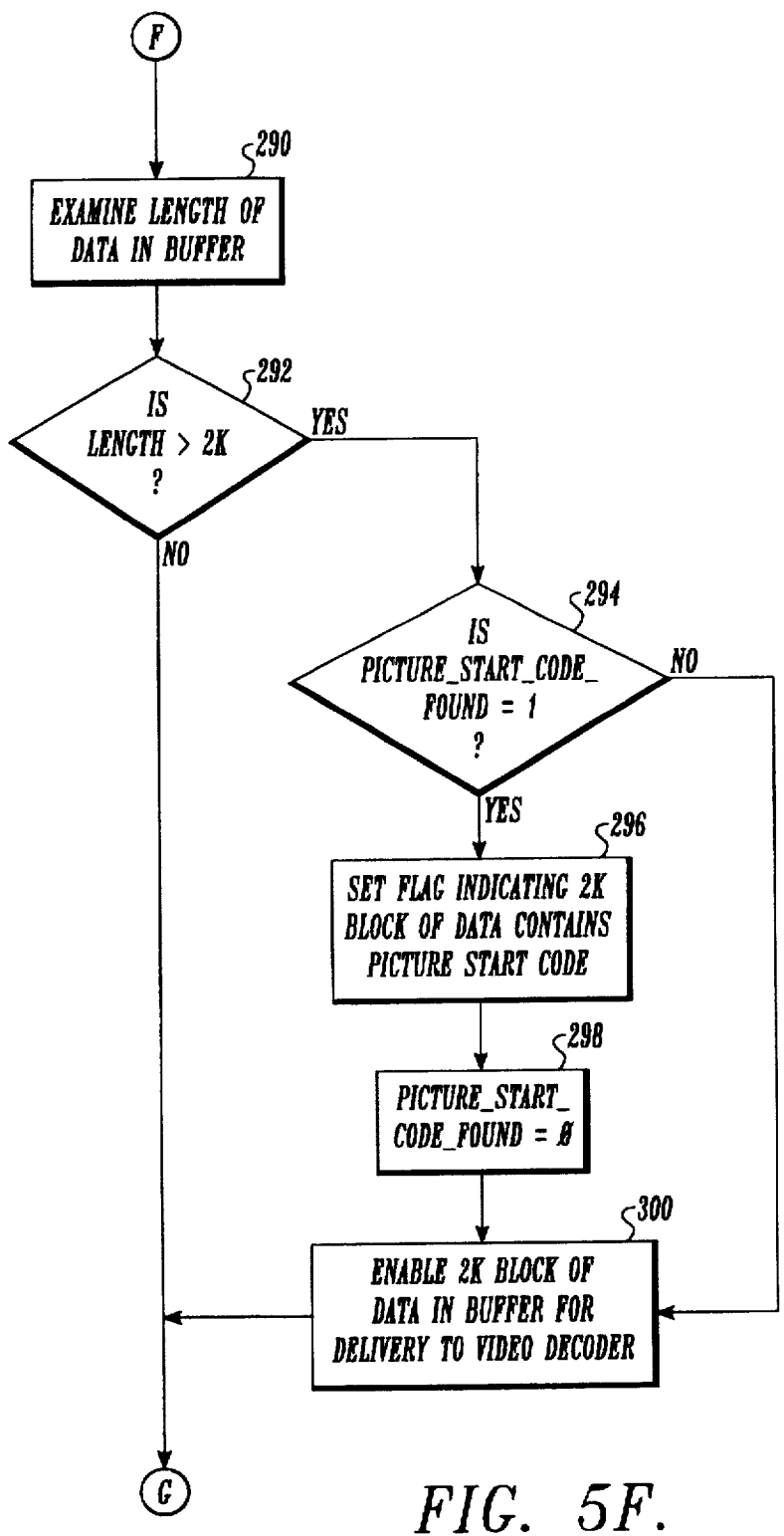
Figure 5G:
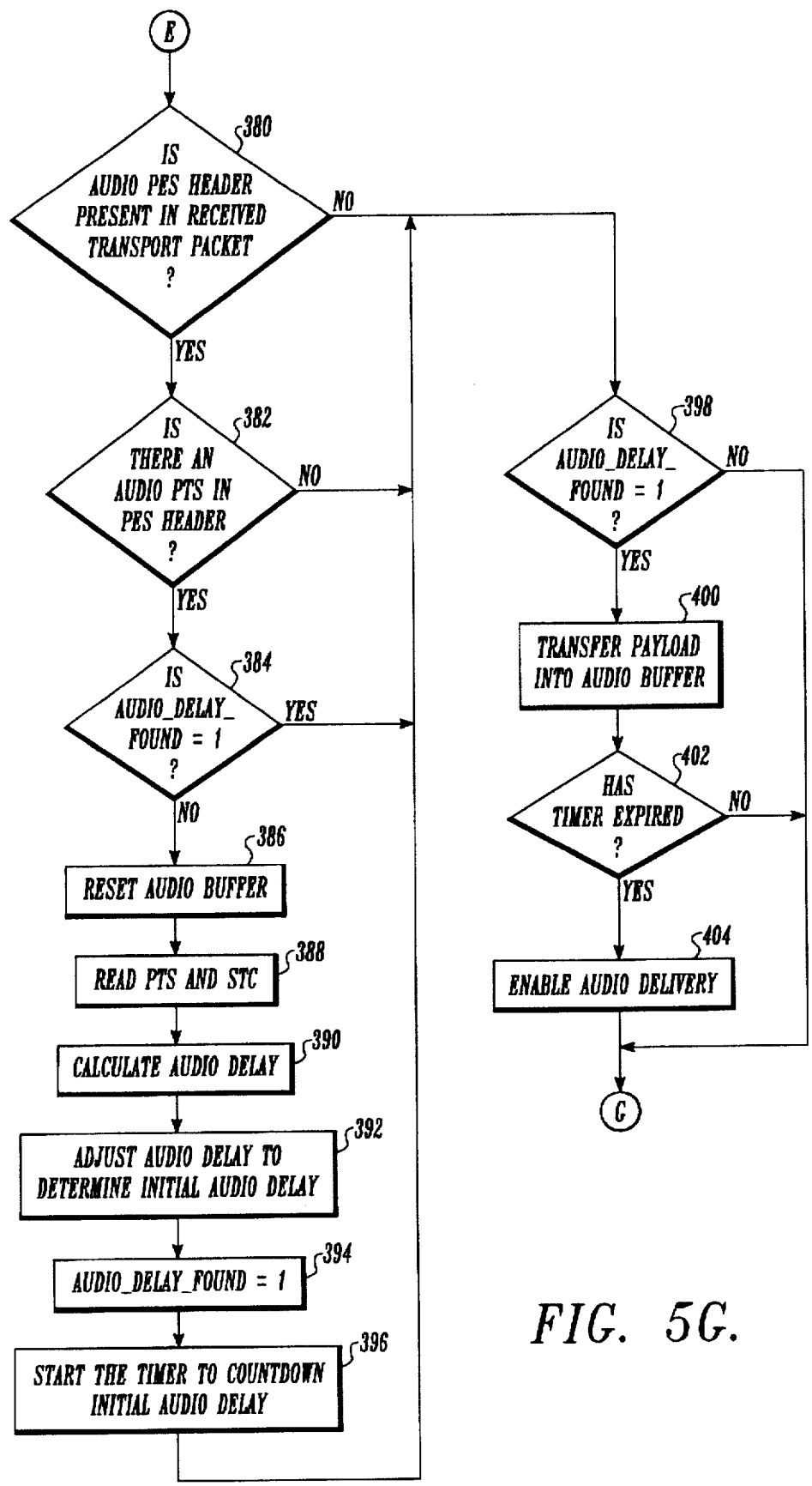

With reference to FIG. 5G, if the audio packet includes a PTS and the initial audio delay has not been calculated, the routine continues to a block 386 where the audio buffer is reset. After receiving the first PTS, any audio data remaining in the audio buffer is discarded. At block 388, the value of the PTS is parsed from the PES packet header and the value of the STC is read. At block 390, the audio delay associated with the current video PES packet is calculated by subtracting the STC value from the value of the audio PTS, according to equation (1) above. At block 392, the audio delay is adjusted to account for audio decoding, audio transmission, and video decoding times, according to equation (2). At block 394, a flag is set indicating that the initial audio delay has been calculated. As discussed above, the initial audio delay is only calculated once for each new transport stream. At block 396, the initial audio delay is loaded into a timer and the timer started to countdown the delay period.

During the delay period, the audio buffer is loaded with any audio data received in audio PES packets. At decision block 398, a test is made to determine if the initial audio delay has been calculated. If the initial audio delay has not been calculated, the data is discarded, and the next MPEG-2 transport packet processed. If the initial audio delay has been calculated, the transport packet payload is transferred into the audio buffer at a block 400. At a decision block 402, a test is made to determine if the timer that counts down the initial audio delay has expired. Until the timer expires, the audio data is loaded into the audio buffer but not enabled for delivery to the audio decoder. When the initial audio delay expires, at a block 404 the audio data is enabled for delivery to the MPEG-1 audio decoder. Once enabled, the MPEG-1 audio decoder may download the data at an appropriate rate for presentation of the data to a listener.

If the transport stream is correctly multiplexed, the amount of data in the audio delivery buffer will be sufficient so that the audio decoder will not underflow or overflow. It is noted that once an initial audio delay is calculated, the audio data is presented at a bursted rate driven by the audio decoder. In the case of acquiring a new channel or after the occurrence of errors in the stream, the above-described procedure must be repeated in order to establish or re-establish synchronization. It will be noted that the MPEG committee suggests an audio/video delay of 40 ms or less. The above implementation has been tested and satisfies this criteria and is therefore considered compliant with MPEG specifications.

Figure 6:
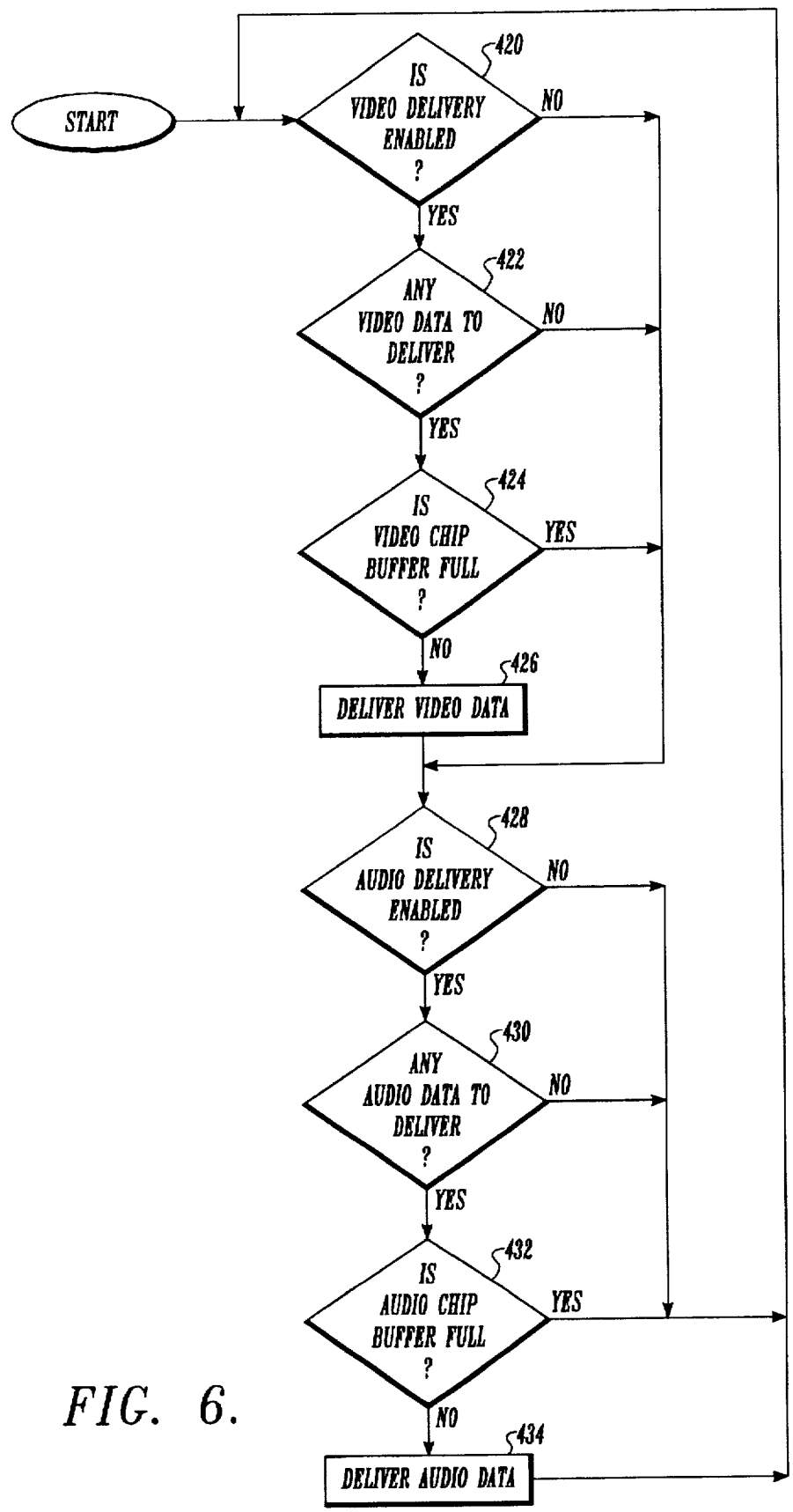
FIG. 6 is a flowchart of an exemplary routine for transferring stored blocks of audio and video data to the MPEG-1 audio and video decoders.

The routine described in FIGS. 5A–5G demultiplexes the transport packets received in an MPEG-2 transport stream and loads the video and audio data received in the stream into video and audio buffers, respectively. FIG. 6 is a flow chart of a background routine that is continuously running to transfer the audio and video data from the buffers to the audio and video decoders. At a decision block 420, the routine determines if video delivery has been enabled. Preferably, video delivery is enabled when a program clock reference value has been recovered from the transport stream and used to initialize a system time clock within the MPEG-2 decoder. Further information about the initialization of the system time clock is provided in the copending *System Clock Recovery* application. If video delivery is enabled, at a decision block 422 a test is made to see if there is any video data to deliver. Although video data may be stored in the video buffer, it is not available for delivery until enabled in the manner discussed above with respect to the processing of the transport packets. If video delivery is not enabled, or there is no video data to deliver, the routine jumps to the audio delivery portion beginning at a block 428.

At decision block 424, a test is made to determine if a buffer contained on the video decoder is full. That is, the routine determines whether the MPEG-1 video decoder can accept video data. If data can be accepted, at a block 426 video data is transferred from the video buffer to the video decoder buffer. The amount of data transferred depends on the space available at the video decoder.

After transferring available video data to the video decoder, at blocks 428-434 the same process is repeated with respect to audio data. At a block 428, a test is made to determine if audio delivery has been enabled. If enabled, at decision blocks 430 and 432, a test is made to determine if there is any audio data to deliver and if the audio decoder buffer is full. If data is enabled for transfer, and the buffer at the audio decoder can accept the data, at a block 434 audio data is transferred from the audio buffer to the buffer contained in the audio decoder. The mount of data transferred depends on the space available at the audio decoder.

After transferring available audio data, the routine repeats starting with block 420. As the demultiplexer is removing audio and video data from the transport packets and loading the data into the audio and video buffers, the demultiplexer is also transferring the data from the audio and video buffers to the audio and video decoders. It will be appreciated that other background tasks may also be included in the routine portrayed in FIG. 6. For example, private data received in the transport stream must by demultiplexed from the stream and processed. The processing of private or other data is not shown in the flow charts of FIGS. 5A-5G and FIG. 6, and is beyond the scope of the present invention.

While the preferred embodiment of the invention has been illustrated and described, it will be appreciated that various changes can be made therein without departing from the spirit and scope of the invention. For example, it will be appreciated that the PES packet video data may be divided into blocks that are greater or less than 2K in length. A 2K block was selected because it minimizes the required buffer size and prevents more than a single picture start code from being present in each block. A greater or lesser block size may be selected, however, as dictated by the available hardware and processing capabilities of the system.

Those skilled in the art will also appreciate that the orphan bytes at the transport level can be handled other than as described above. For example, instead of passing the orphan byte forward to the next received transport packet in a PES packet, a byte may be borrowed from the next transport packet and passed back to the current transport packet being processed. Similar processing may be performed for orphan bytes at the PES packet level.

It will also be appreciated that the software routine is exemplary in nature and various changes can be made to the routine. Other types of data may be demultiplexed, or the data manipulated based on information contained within the transport and PES packet headers. Consequently, within the scope of the appended claims it will be appreciated that the invention can be practiced other than as specifically described herein.

The embodiments of the invention in which an exclusive property or privilege is claimed are defined as follows:

1. A method of ensuring synchronization of MPEG-1 video and audio data carried in an MPEG-2 transport stream for decoding by an MPEG-1 video decoder and an MPEG-1 audio decoder, the transport stream including a plurality of packetized elementary stream (PES) packets containing video or audio data, each PES packet including a packet start code prefix identifying it as a PES packet and identifying the PES packet as either a video or an audio packet, with two or more of the PES packets including a video presentation time stamp (PTS) or an audio PTS that enables playback of data in the PES packet to be synchronized with a system time clock, the PES packets having video data and a video PTS including one or more picture start codes that indicate the beginning of a new frame of video data, the method comprising:

(a) searching the MPEG-2 transport stream for a packet start code prefix indicating the start of a PES packet;

(b) if the PES packet is a video PES packet, examining the video PES packet to determine if a video PTS is present;

(c) storing the data associated with the PES packet into a buffer;

(d) if the PES packet is a video PES packet that includes a video PTS in its header, (i) examining the video data in the PES packet during storage to locate the first occurrence of a picture start code, and upon locating the first occurrence of a picture start code, setting a flag indicating the correspondence between the video PTS and the identified picture start code and storing the video data remaining in the video PES packet without further examination; and (ii) transmitting blocks of the video data from the buffer to the video decoder in known lengths, each block including a flag indicative of whether the identified video PTS corresponds to a picture start code within that block, if a picture start code is present in that block; and (e) if the PES packet is a video PES packet that does not include a video PTS in its header, transmitting blocks of the video data from the buffer to the video decoder in known lengths.

2. The method of claim 1, wherein the step of transmitting blocks of the video data from the buffer to the video decoder in known lengths for video PES packets that do not include a video PTS includes providing a flag in each block indicating that there is not a video PTS that corresponds to a picture start code within that block.

3. The method of claim 1, wherein the step of transmitting blocks of the video data from the buffer to the video decoder in known lengths includes the step of ensuring that each block contains an even number of bytes.

4. The method of claim 3, wherein the step of ensuring that each block contains an even number of bytes includes removing a byte of data from the PES packet being processed if the PES packet contains an odd number of bytes and appending the byte of data to a subsequent video PES packet.

5. The method of claim 1, wherein if the PES packet is an audio PES packet, transmitting blocks of the audio data from the buffer to the MPEG-1 audio decoder after an initial audio delay.

6. The method of claim 5, wherein the initial audio delay is computed by:

(a) searching the transport stream for an audio PTS and ascertaining its value;

(b) reading the value of the system time clock; and (c) calculating the audio delay by computing the difference between the value of the audio PTS and the value of the system time clock.

7. The method of claim 6, wherein the audio delay is adjusted to account for audio decoding and audio transmission times.

8. The method of claim 7, wherein the audio delay is further adjusted to account for any delay associated with video decoding.

9. A method of ensuring synchronization of MPEG-1 data carried in an MPEG-2 transport stream for decoding by an MPEG-1 decoder, the transport stream including a plurality of packetized elementary stream (PES) packets having video or audio data, each PES packet-including a packet start code prefix identifying it as a PES packet and identifying the PES packet as either a video or an audio packet, with two or more of the PES packets including a video presentation time stamp (PTS) or an audio PTS that enables playback of data in the PES packet to be synchronized with a system time clock, the PES packets having video data and a video PTS including one or more picture start codes that indicate the beginning of a new frame of video data, the method comprising:

(a) searching the MPEG-2 transport stream for a packet start code prefix indicating the start of a PES packet;

(b) if the PES packet is a video PES packet, examining the video PES packet to determine if a video PTS is present;

(c) storing the data associated with the PES packet into a buffer;

(d) if the PES packet is a video PES packet that includes a video PTS in its header, (i) examining the video data in the PES packet during storage to locate the first occurrence of a picture start code and, upon beating the first occurrence of a picture start code, setting a flag indicating the correspondence between the video PTS and the identified picture start code and storing the video data remaining in the video PES packet without further examination; and (ii) transmitting blocks of the video data from the buffer to the video decoder in known lengths, each block including a flag indicative of whether the identified video PTS corresponds to a picture start code within that block, if a picture start code is present in that block;

(e) if the PES packet is a video PES packet that does not include a video PTS in its header, transmitting blocks of the video data from the buffer to the video decoder in known lengths; and (f) if the PES packet is an audio PES packet, transmitting blocks of the audio data from the buffer to the audio decoder after an audio delay.

10. The method of claim 9, and further including repeating steps (a)–(f) for each PES packet in the MPEG-2 transport stream.

11. The method of claim 9, wherein the step of transmitting blocks of the video data from the buffer to the video decoder in known lengths includes the step of ensuring that each block contains an even number of bytes.

12. The method of claim 11, wherein the step of ensuring that each block contains an even number of bytes includes removing a byte of data from the PES packet being processed if the PES packet contains an odd number of bytes and appending the byte of data to a subsequent PES packet.

13. The method of claim 9, wherein the audio delay is computed by:

(a) searching the transport stream for an audio PTS and ascertaining its value;

(b) reading the value of the system time clock; and (c) calculating the audio delay by computing the difference between the value of the audio PTS and the value of the system time clock.

14. The method of claim 13, wherein the audio delay is adjusted to account for audio decoding, audio transmission, and video decoding times.

* * * * *

UNITED STATES PATENT AND TRADEMARK OFFICE
CERTIFICATE OF CORRECTION

PATENT NO. : 5,726,989
DATED : March 10, 1998
INVENTOR(S) : M.V. Dokic

It is certified that error appears in the above-indentified patent and that said Letters Patent is hereby corrected as shown below:

| COLUMN | LINE | |
|---|---|---|
| [56]<br>Pg. 1, col. 1 | Refs. Cited<br>(Other Publs.) | "Coding of Moving Pictures and Associated Audio: Systems" should appear in character italics |
| [56]<br>Pg. 1, col. 1 | Refs. Cited<br>(Other Publs.) | "No. 801," should read --N0801,-- |
| 15<br>(Claim 9, | 23<br>line 5) | "packet-including" should read --packet including-- |
| 16<br>(Claim 9, | 1<br>line 26) | "beating" should read --locating-- |

Signed and Sealed this

Fourth Day of August, 1998

Attest:

BRUCE LEHMAN

Attesting Officer     Commissioner of Patents and Trademarks